March 23, 1926.
W. P. BUDD
MOTOR VEHICLE
Filed Jan. 21, 1925   3 Sheets-Sheet 1
1,577,559
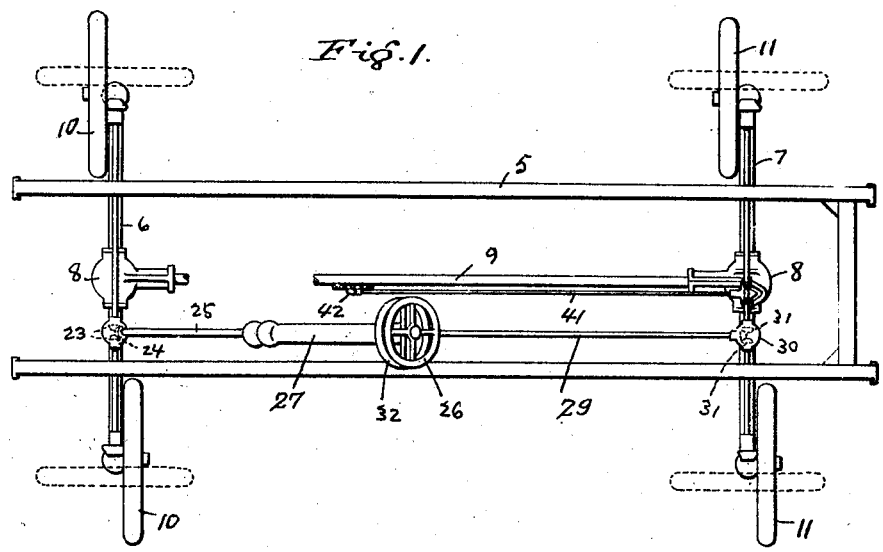
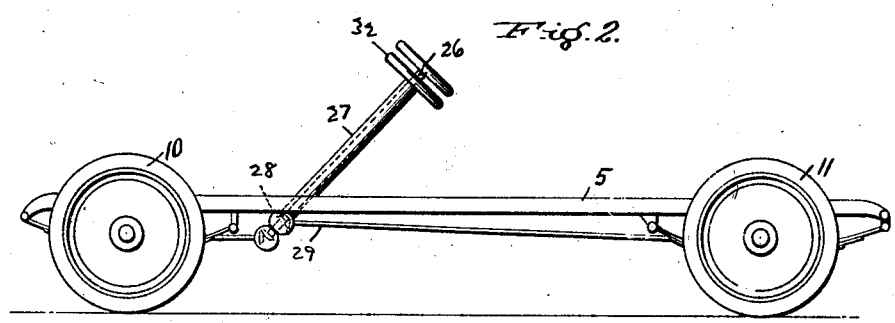
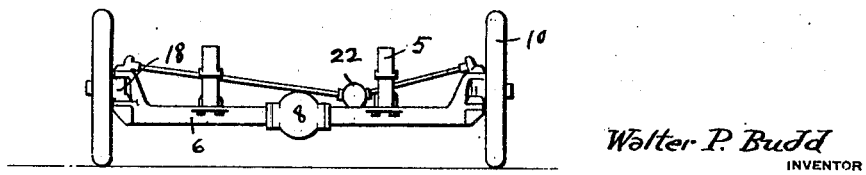
Walter P. Budd
INVENTOR
BY Victor J. Evans
ATTORNEY
WITNESS: Gerald Hennesy March 23, 1926.
W. P. BUDD
MOTOR VEHICLE
Filed Jan. 21, 1925
1,577,559
3 Sheets-Sheet 2
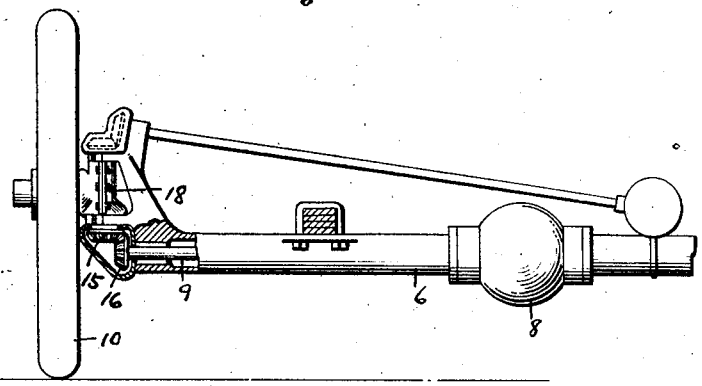
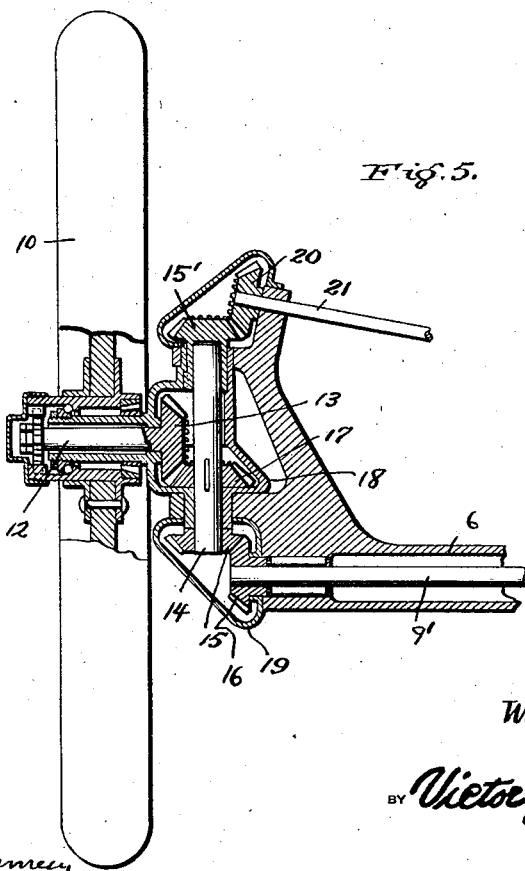
Walter P. Budd,
INVENTOR
BY Victor J. Evans
ATTORNEY March 23, 1926.
W. P. BUDD
MOTOR VEHICLE
Filed Jan. 21, 1925
1,577,559
3 Sheets-Sheet 3
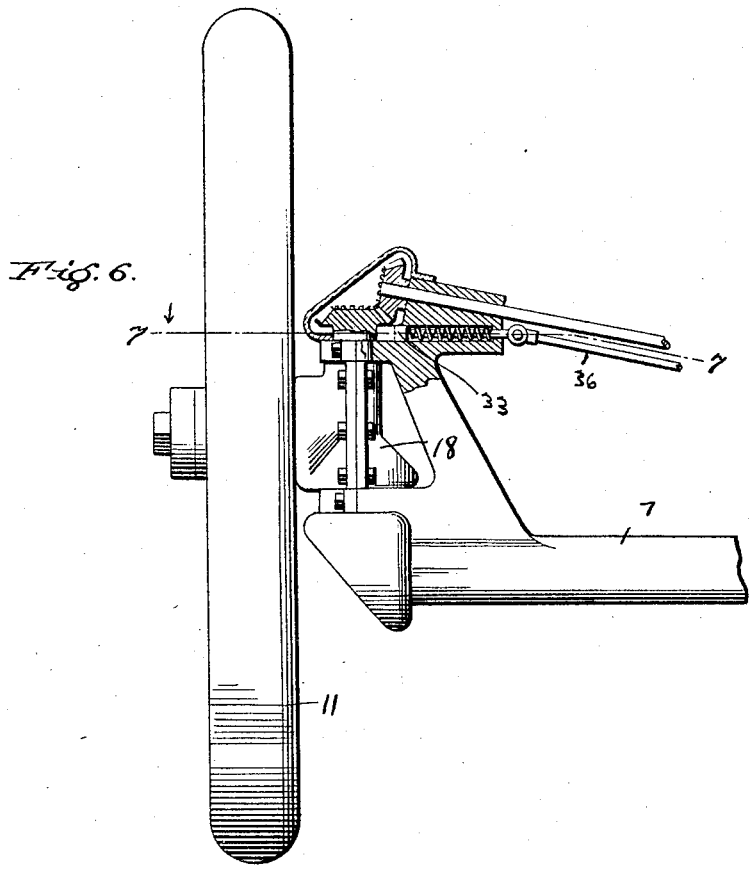
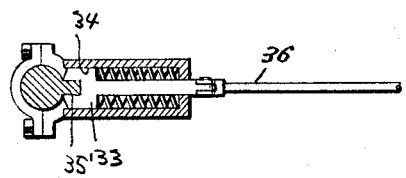
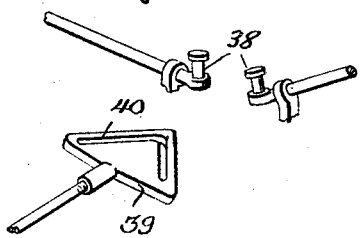
Walter P. Budd,
INVENTOR
BY Victor J. Evans
ATTORNEY
WITNESS: Gerald Hennessy Patented Mar. 23, 1926.

1,577,559

UNITED STATES PATENT OFFICE.

WALTER P. BUDD, OF PITTSBURGH, PENNSYLVANIA.

MOTOR VEHICLE.

Application filed January 21, 1925. Serial No. 3,850.

*To all whom it may concern:*

Be it known that I, WALTER P. BUDD, a citizen of the United States, residing at Pittsburgh, in the county of Allegheny and State of Pennsylvania, have invented new and useful Improvements in Motor Vehicles, of which the following is a specification.

My invention relates to motor vehicles and the principal object is to provide a four-wheel drive and four wheel steered vehicle.

A further object of the invention is to provide a motor vehicle wherein all four wheels are driven and which also are operatively connected together through the instrumentality of a steering mechanism whereby the wheels may be positioned for driving the vehicle laterally if desired and which will be found extremely advantageous in congested districts for parking the vehicle in a space large enough for receiving the same but too small for driving a vehicle not equipped with the invention.

Still another object of the invention is to provide a four wheel drive motor vehicle wherein the two rear wheels are locked against steering movement by a common locking mechanism which is adapted to be actuated when it is desired to steer the vehicle laterally.

With the preceding and other objects and advantages in mind, the invention includes the following novel features and details of construction to be hereinafter more fully described, illustrated in the accompanying drawings, and pointed out in the appended claims.

In the drawings:

Figure 1 is a top plan view of a motor vehicle constructed in accordance with my invention.

Figure 2 is a side elevation of the same.

Figure 3 is a front elevation.

Figure 4 is a fragmentary detail view of parts of the invention, part being broken away.

Figure 5 is a similar view showing the operative parts on an enlarged scale.

Figure 6 is a fragmentary detail view partly in elevation and having parts broken away and showing one of the rear wheels.

Figure 7 is a detail view taken on line 7—7 of Figure 6.

Figure 8 is a perspective of the elements used in the invention.

Referring to the drawings in detail wherein like characters of reference denote corresponding parts throughout the several views, the numeral 5 designates a chassis or frame of the motor vehicle, while 6 and 7 designate the front and rear axles respectively, each of the latter being equipped with the usual differentials designated at 8. The main drive shaft is designated at 9 and is driven from the engine, not shown, and extends to the differentials 8 and is operatively associated therewith in a well known manner.

Arranged in each of the axle housings 6 and 7 are axles 9'. The front steering wheels are designated at 10 while the rear steering wheels are designated at 11. These front steering wheels are revoluble about stub axles or shafts 12 carrying pinions 13 upon their inner ends, and spindles 14 are carried by the ends of the front axle housings 6. A pinion 15 is keyed to the lower end of spindles 14 and meshes with the pinions 16 upon the ends of the axle 9'. A pinion 17 is carried by the spindle 14 and is in mesh with the pinion 13. Surrounding the pinions 13 and 17 are housings or castings 18 which are formed with laterally extending sleeves which are mounted in bearings on the axle housing 6. A pinion 15' is keyed to the upper sleeve of the housing 18 and meshes with a pinion 20 carried by shafts 21 extending to a pinion housing 22. Carried by the front axle housing and secured upon the inner ends of these shafts and arranged within this housing 22 is a pair of pinions 23 which are engaged by a similar pinion 24 which is geared to the main steering wheel post 25, the latter being equipped with the usual steering wheel 26. A second steering wheel post 27 is provided for the rear wheel and surrounds the main steering wheel post 25 and carries a pinion 28 which meshes with a pinion on the rearwardly extending shaft 29, the latter extending to a pinion housing 30 and meshing with a pair of pinions 31 carried by the housing 30. The steering wheel post 27 is provided with a steering wheel 32.

As illustrated in Figures 6 and 7 I have provided a mechanism for locking the rear wheel against steering movement. This structure embodies a spring pressed latch element 33 which is longitudinally movable in a longitudinal recess 34 formed in the wheel supporting bracket of the rear axle. This latch element 33 is provided with a notch or recess 35' which engages a lug on a pinion of the wheel driving means as shown in Figures 6 and 7. Each of the latch elements 33 is connected with a longitudinally movable rod 36 which rods extend longitudinally of the rear axle housing and terminate in heads 38. The reference numeral 39 designates a substantially triangular shaped plate having diverging slots 40 therein which receives the heads 38. A rod 41 extends from this plate 39 to a lever 42 within reach of the operator.

From the disclosure it will be apparent that the front and rear axles are driven and through the instrumentality of the pinions above set forth, all four wheels will be uniformly driven. However, when it is desired to steer the automobile laterally as is the case when parking, the rod 41 is shifted to move the plate which in turn draws the rods towards each other and thereby disengages the latch elements 33 from the lugs 35. The steering wheel 32 is then rotated and through the instrumentality of the shaft 29 and the operative connection between the same and rear wheels, the latter may be turned to a right angular position, as shown in Figure 1. The vehicle can then be driven on its own power laterally into a parking space.

While I have shown and described the preferred embodiment of the invention, I desire to have it understood that I do not limit myself to what is herein shown and described, as such changes may be made in the form, construction and arrangement of parts and operation, as will not depart from the spirit of the invention or the scope of the subjoined claims.

Having thus described the invention, what is claimed is:—

1. The combination with a four wheel driven automobile, of means for steering the rear wheels thereof including a steering wheel, operative connections between the steering wheel and rear wheels, and means for normally holding the rear wheels against steering movement, said means including spring pressed latch elements normally engaging a part of the wheel driving means, rods connected with the latch elements and operating means connected with the rods for retracting the latch elements from the part of the wheel driving means.

2. The combination with a vehicle chassis and front and rear drive wheels therefor, spindles supporting the rear drive wheels to permit the latter to turn about a vertical axis, pinions carried thereby, a pair of steering shafts, pinions carried thereby and meshing with the first mentioned pinions, a steering wheel operatively connected with the steering shaft, and means for normally holding the spindles stationary including spring pressed latch elements normally engaged with the spindles, rods extending from the latch elements and manually operable means for shifting the rods in a direction to retract the latch elements.

3. The combination with a vehicle chassis and front and rear drive wheels therefor, spindles supporting the rear drive wheels to permit the latter to turn about a vertical axis, pinions carried thereby, a pair of steering shafts, pinions carried thereby and meshing with the first mentioned pinions, a steering wheel operatively connected with the steering shaft, means for normally holding the spindles stationary including spring pressed latch elements normally engaged with the spindles, rods extending from the latch elements and manually operable means for shifting the rods in a direction to retract the latch elements, said means including a plate pivotally mounted upon one of the rods and having slidable engagement with the other rod, of an operating rod connected with the plate, and a handle associated with the operating rod.

4. A rear wheel steering mechanism comprising a support, a pair of spindles carried thereby, wheels on the spindles, pinions also on the spindles, spring pressed latch elements normally engaging the pinions and holding the same against movement, rods extending from the latch elements, and terminating in upstanding heads, a triangular plate pivotally mounted on one of the heads and provided with a slot through which the other head extends, an operating rod connected with the plate, and pinions engaging the first mentioned pinion, and a steering mechanism operatively connected with the last mentioned pinion.

5. The combination with an axle housing and castings carried thereby, and provided with longitudinal recesses, wheel spindles journaled in the castings, slidable latch elements in the recesses and normally engaging the spindles and holding them stationary, a common mechanism connected with the latch elements for moving the same out of engagement with the spindles, a steering wheel, a steering shaft operated thereby and pinions on the steering shaft and meshing with the first mentioned pinions.

In testimony whereof I affix my signature.

WALTER P. BUDD.